Oct. 22, 1929.  F. J. NAIBERT  1,732,310
VACUUM SKIN CLEANSER
Filed Nov. 1, 1928  2 Sheets-Sheet 2
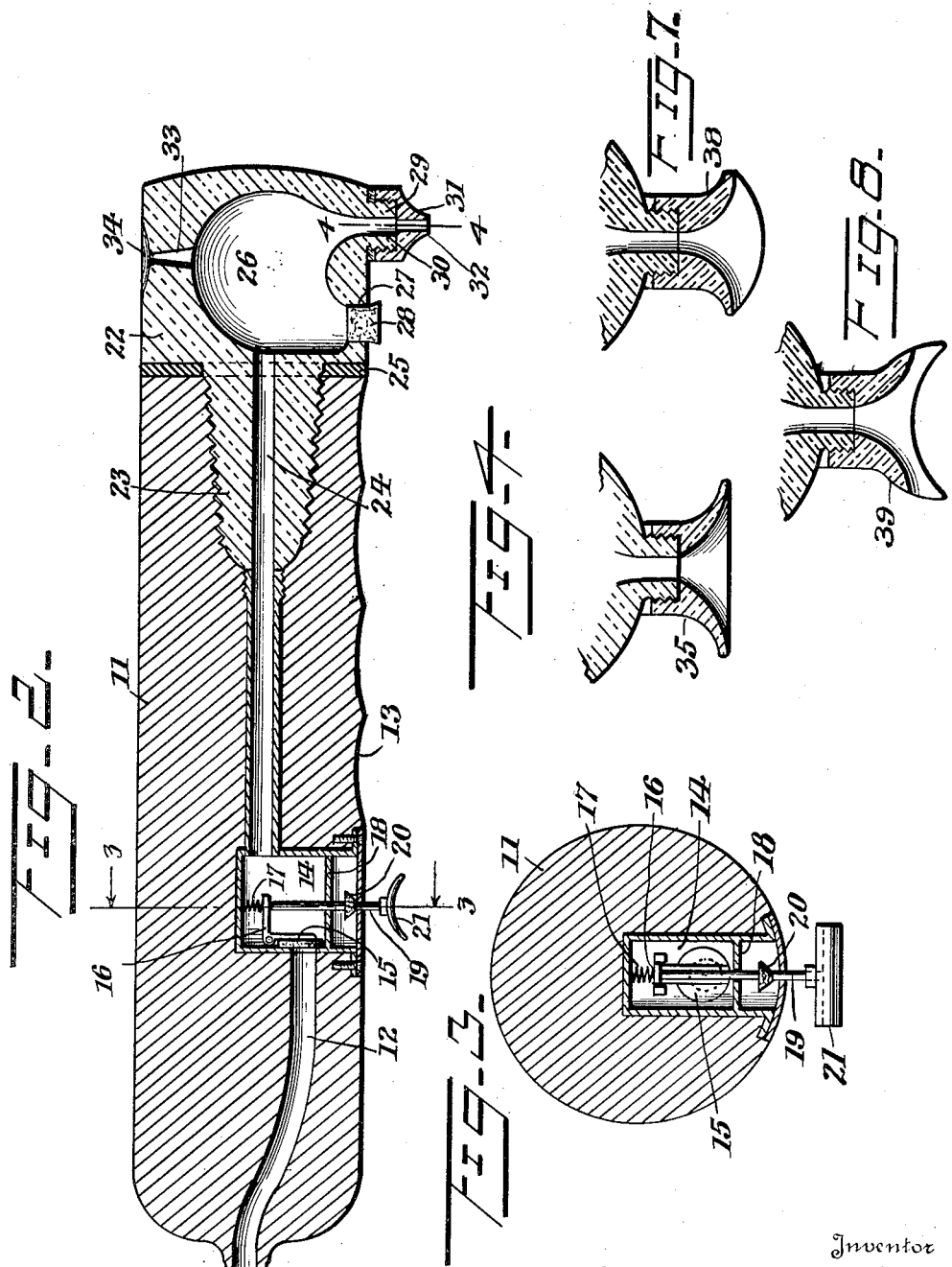
Inventor
F. J. Naibert
By Jacobi & Jacobi
Attorneys Patented Oct. 22, 1929

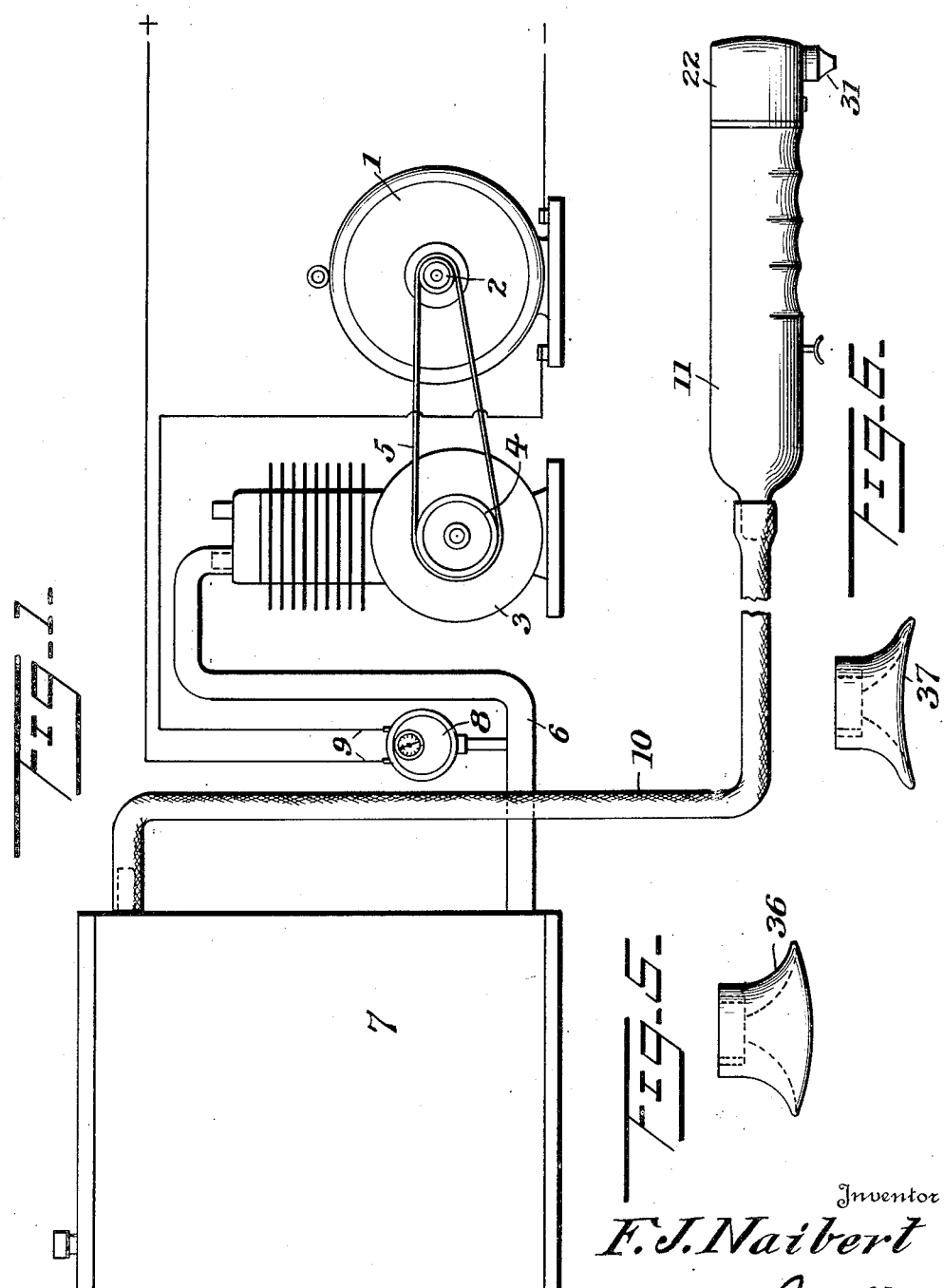

1,732,310

UNITED STATES PATENT OFFICE

FRANK J. NAIBERT, OF CEDAR RAPIDS, IOWA

VACUUM SKIN CLEANSER

Application filed November 1, 1928. Serial No. 316,579.

This invention relates to a vacuum skin cleanser and it consists in the novel features hereinafter described and claimed.

The usual hand massage in the treatment of skin is going out of vogue as in massaging, it often pinches and squeezes the tender tissues of the skin, irritating the tiny glands thereof and preventing them from performing their proper functions of elimination. When the glands are irritated, they immediately become swollen after the treatment and due to the swelling, the substances that should be eliminated are again held back in the cells and often disagreeable blotching results.

A prime object of the present invention is to provide simple and efficient means for cleansing the pores of the skin by producing a cupping stimulating action thereon.

With this object in view the device includes a handle nozzle having the ends for connection with a suction apparatus. The nozzle is provided with a head having a chamber for the reception of corruption and to which a tip of desired form may be connected. The head is provided with a clean-out opening which communicates with said chamber and which is normally closed by a stopper or other suitable closure. A vent hole connects with the chamber and the thumb of the operator may be placed over said vent hole for controlling the pressure or suction. A finger-operated valve is located in the nozzle and is adapted to be controlled by the operator.

In the accompanying drawings:

Figure 1 is a side elevational view of the vacuum skin cleanser showing the head connected with a suction apparatus.

Figure 2 is a longitudinal sectional view of the nozzle of the vacuum skin cleanser and the parts thereof.

Figure 3 is a transverse sectional view of the nozzle on the line 3—3 of Figure 2.

Figure 4 is a detail sectional view of one form of the nozzle tip.

Figures 5, 6, 7 and 8 are detailed views of modified forms of the nozzle tip which may be used.

The suction apparatus which may be used for creating suction draughts through the nozzle includes a motor 1 having upon its shaft a pulley 2. A suction pump 3 carries upon its shaft a pulley 4. A belt 5 is trained around the pulleys 2 and 4 and is adapted to operate the pump. A pipe 6 is connected at one end with the pump and at its other end with a tank 7. A gauge 8 is mounted upon the pipe section and wiring 9 is connected with the gauge and may be connected with any suitable alarm device (not shown). A suction pipe or hose 10 is connected at one end with the tank 7 and a nozzle 11 is connected with the free end of the pipe or hose 10.

The nozzle 11 is in the form of an elongated body having a duct 12 traversing the length thereof and the nozzle is provided at one side with several recesses 13 adapted to receive the finger of the operator so that the nozzle cannot slip in the hand when being used. The nozzle 11 is provided at a point at the foremost end with a chamber 14 which communicates with the intermediate portion of the duct 12.

A valve 15 is pivotally mounted in the chamber 14 and is adapted to close against the inner end of one section of the duct 12. The valve 15 is provided at one edge adjacent the point where it is pivotally mounted with an arm 16 and a spring 17 is interposed between the said arm and the rear of the chamber and serves to hold the valve 15 normally at a closed position against the suction of the duct 12.

A partition 18 is located in the chamber 14 below the valve 15 and a rod 19 passes through the said partition and bears at its inner end against the side of the arm 16. A washer 20 is carried by the rod 19 and is adapted to engage the outer surface of the partition 18 and prevent leakage at the point where the said rod passes through the partition and when the rod is moved so that the washer is brought in contact with the surface of the partition. A finger plate 21 is carried by the rod 19 and is disposed beyond the exterior surface of the nozzle 11 and normally spaced therefrom.

A head 22 is provided with a shank 23 which is screwed into the end of the nozzle 11, the said shank having a duct 24 which communicates at one end with the end of one of the sections of the duct 12. A washer 25 surrounds the shank of the head and is interposed between the inner side of the head and the end of the nozzle body and is adapted to prevent leakage through the screw-thread connection between the head and the body of the nozzle. The head 22 is provided with a chamber 26 with which one end of the duct 24 communicates. The chamber 26 is adapted to receive the corruption which is removed from the skin of the patient as will be hereinafter described.

The head 22 is provided at its side with a cleanout opening 27 which is normally closed by a calk or other closure 28.

The head 22 is provided at its side with a boss 29 having an opening 30 which communicates with the interior of the head and the chamber 26 thereof. A tip 31 is screwed upon the boss 29 and is provided with an opening 32 which communicates with the opening 30. The tip may be of any design or configuration as illustrated in Figures 5 to 8 inclusive of the drawing so that the tip may snugly fit upon the part of the body to which it is applied. Furthermore, the opening through the top may be of any desired shape so that the edges of the opening may have proper contact with the skin of the patient when the device is being used for cleansing the skin by a cupping action. The head 22 is provided with a vent 33 which communicates at its inner end with the chamber 26 and the outer end of the said vent lies in a depression 34 provided at the side of the head 22 and which may receive the ball of the thumb of the operator so that the thumb may lie over the vent 33 and thus control the passage of air from the exterior into interior of the head and thus increasing or diminishing the suction force and causing the head to properly cleanse the corruption from the pores of the skin of the patient.

When the device is being used for cleansing the skin, the nozzle 11 is grasped by the operator so that certain of the fingers enter the recesses 13 and one finger may be used for pressing the plate 21 whereby the valve may be moved from a closed to an open position in the chamber 14. Thus, the suction draught created by the suction apparatus may be cut off when desired.

I have also provided some modified forms of nozzle tips as shown in Figures 4, 5, 6, 7 and 8 and known as 35, 36, 37, 38 and 39, respectively.

From the foregoing description of the construction of my improved apparatus, it will be seen that I have provided a simple, inexpensive and efficient means for carrying out the objects of my invention and while I have particularly described the elements best adapted to perform the functions set forth, it is obvious that various changes in form, proportion and in the minor details of construction may be resorted to without departing from the spirit or sacrificing any of the principles of the invention.

Having thus described my invention, what I claim is:

1. In a vacuum cleanser of the class described, a nozzle comprising a body having two longitudinal ducts extending from the opposite ends thereof and disposed out of longitudinal alignment, said body being also provided with a chamber intermediate its ends to which the inner ends of said ducts lead, a valve in said chamber and means for manually controlling said valve by the operator of the nozzle.

2. In a vacuum cleanser of the class described, a nozzle comprising a body having two longitudinal ducts extending from the opposite ends thereof and disposed out of longitudinal alignment, said body being also provided with a chamber intermediate its ends to which the inner ends of said ducts lead, a valve in said chamber, means for manually operating said valve and a removable head on the outer end of said nozzle having an outlet therein communicating with one of said ducts.

3. In a vacuum cleanser of the class described, a nozzle comprising a body having two longitudinal ducts extending from the opposite ends thereof and disposed out of longitudinal alignment, said body being also provided with a chamber intermediate its ends to which the inner ends of said ducts lead, a valve in said chamber, means for manually operating said valve, a removable head on the outer end of said nozzle having an inlarged chamber therein communicating with one end of said ducts, said chamber having a restricted outlet disposed in a plane substantially at right angles to the plane of the last mentioned duct.

4. In a vacuum cleanser of the class described, a nozzle comprising a body having two longitudinal ducts extending from the opposite ends thereof and disposed out of longitudinal alignment, said body being also provided with a chamber intermediate its ends to which the inner ends of said ducts lead, a valve in said chamber, means for manually operating said valve, a removable head on the outer end of said nozzle having an enlarged chamber therein communicating with one end of said ducts, said chamber having a restricted outlet disposed in a plane substantially at right angles to the plane of the last mentioned duct and a removable tip applied to the outlet end of said head.

5. In a vacuum cleanser of the class described, a nozzle comprising a body having two longitudinal ducts extending from opposite ends thereof and disposed out of longitudinal alignment, said nozzle being also provided with a chamber intermediate of its ends to which the inner opposed ends of said ducts lead, a valve mounted in said chamber, means for manually operating said valve, a head member removably applied to the outer end of said nozzle, said head member being provided with an enlarged chamber therein communicating with the outer end of one of said ducts, said chamber having a restricted outlet disposed substantially at right angles to the last mentioned duct, an externally threaded boss formed on said head member and having said restricted outlet of the last mentioned chamber extending therethrough, and a removable tip threaded on said boss, as and for the purposes described.

In testimony whereof I affix my signature.

FRANK J. NAIBERT.